May 26, 1936.　　　E. A. FORSBERG　　　2,042,300

PULSATOR FOR MILKING MACHINES

Filed March 9, 1934　　2 Sheets-Sheet 1

WITNESS:

INVENTOR

Erik August Forsberg

BY

ATTORNEYS

May 26, 1936.　　　E. A. FORSBERG　　　2,042,300
PULSATOR FOR MILKING MACHINES
Filed March 9, 1934　　　2 Sheets-Sheet 2

WITNESS:

INVENTOR
Erik August Forsberg
BY
ATTORNEYS.

Patented May 26, 1936

2,042,300

UNITED STATES PATENT OFFICE 2,042,300

PULSATOR FOR MILKING MACHINES

Erik August Forsberg, Stockholm, Sweden, assignor to The De Laval Separator Company, New York, N. Y., a corporation of New Jersey Application March 9, 1934, Serial No. 714,749
In Sweden March 18, 1933

13 Claims. (Cl. 31—69)

The invention relates to pulsators of the individual or automatic type as distinguished from so-called centrally-controlled pulsators which are operable from a control device such as a pneumatic or electric master pulsator.

The object of the invention is to provide a pulsator of the individual or automatic type whose operation will be regular and reliable.

In order to milk a cow with maximum efficiency the rate of pulsation must be approximately constant and the pulsator must operate reliably so that unexpected interruptions shall not occur.

The only pulsators that have heretofore satisfied the above requirements and that may be regarded as practically safe are the above specified centrally-controlled pulsators; but owing to the comparatively high initial cost of installations of this type, they have found only a limited use, and so-called individual pulsators are still used to a great extent.

These individual pulsators may be regarded as a kind of vacuum motor. Under the influence of a vacuum a piston, a flexible diaphragm, or the like is brought into movement and controls the members which distribute full atmospheric pressure and vacuum to the teat cups. The rate of pulsation is generally determined by allowing the operating medium to pass through a throttled passage.

In apparatus of this type there are, however, many conditions which tend to change the rate of pulsation and make it rather variable. The narrow air channels used for regulating the rate of the pulsations are liable to become more or less clogged by impurities in the air, and other conditions, such as changes in the mechanical resistances to movement and variations in the temperature, tend to bring about the variability mentioned.

In order to avoid the risk of clogging of the air channels, it has been suggested to let the regulation take place, not by means of the "operation air", but by means of an enclosed quantity of air which circulates to and fro in a closed system. Pulsators of this type have been devised heretofore, but are still open to certain objections, particularly incomplete sealing and considerable mechanical resistances to movement.

The invention is capable of many different embodiments, of which several are shown in the accompanying drawings, of which—

Figure 5:
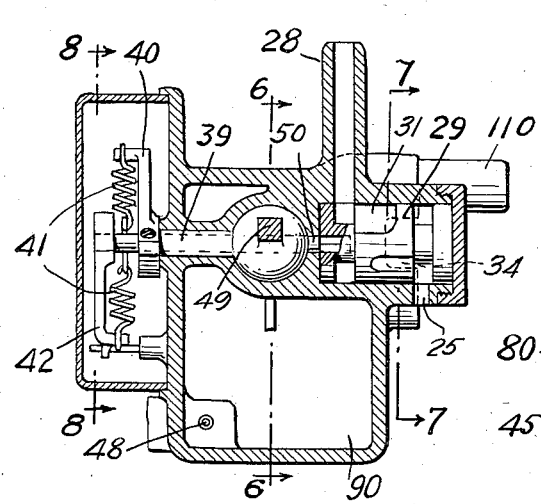
Figure 6:
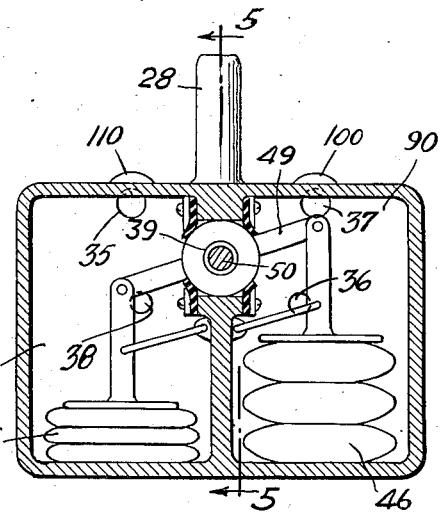
Figure 8:
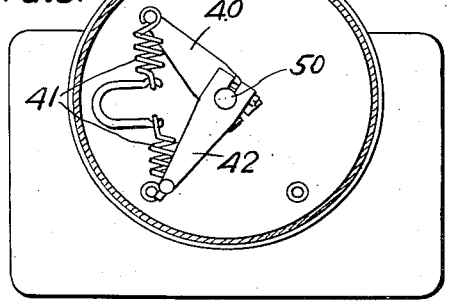
Figure 7:
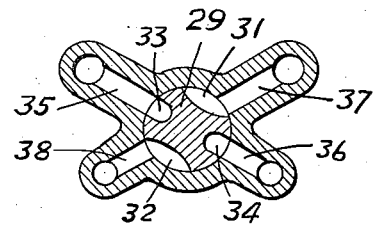

Figs. 5 and 6 are vertical sections in different planes of another modification. Fig. 7 is a section on the line 7—7 of Fig. 5. Fig. 8 is a detail view of the reversing mechanism.

Figure 9:
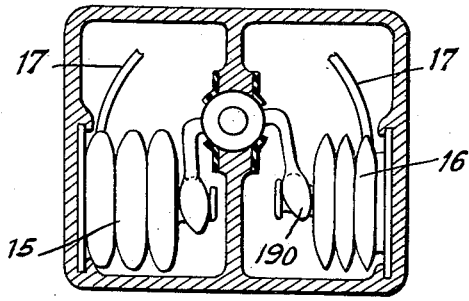

Fig. 9 is a sectional view of a modified form of air container.

Figure 1:
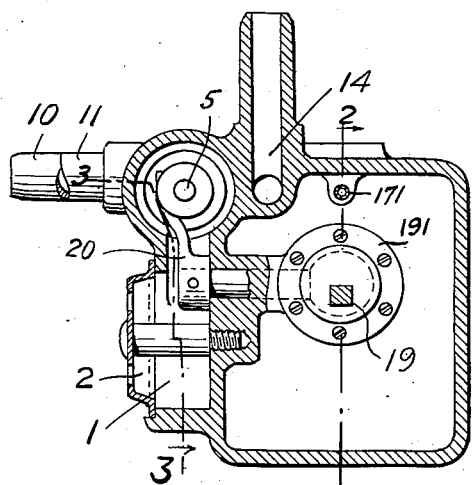
Figs. 1 and 2 are vertical sections in different planes of a pulsator embodying my invention.
Figure 2:
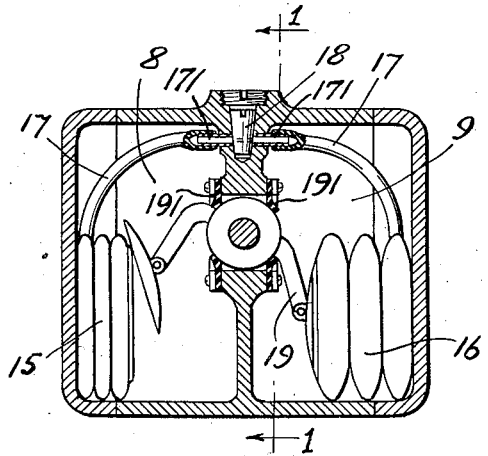
Figure 3:
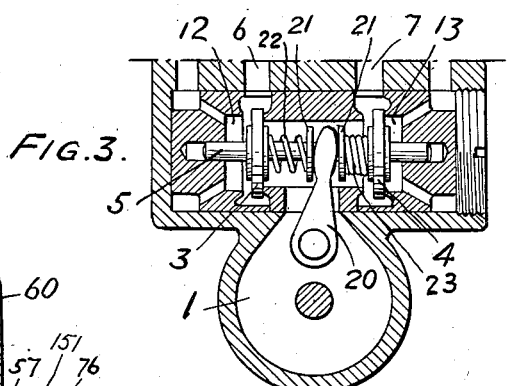
Fig. 3 is a section on the line 3—3 of Fig. 1.
Figure 10:
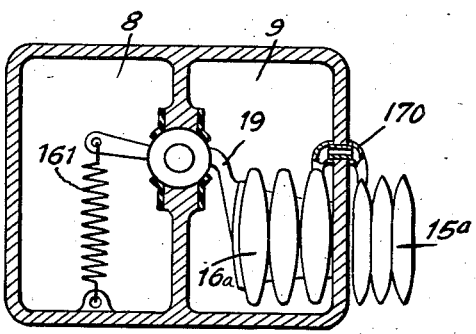

Fig. 10 is a view, similar to Fig. 2, of a modification of the pulsator of Figs. 1, 2 and 3.

Describing first the construction shown in Figs. 1, 2 and 3:

The chamber 1 communicates with the atmosphere in any known manner, preferably through a strainer 2 which prevents coarse impurities from entering with the air. Chamber 1 opens into a valve chamber containing two valves 3 and 4, secured to the spindle 5. In order to facilitate the sealing of both valves simultaneously against their seats, the valves and/or the seats may be made somewhat elastic; or the valves may be allowed to have a slight movement on the spindle.

Valves 3 and 4 open and close communication between chamber 1 and the channels 6 and 7. Channel 6 communicates with chamber 8 and nipple 10. Channel 7 communicates with pulsator chamber 9 and nipple 11. From nipples 10 and 11 extend pipes that communicate with the pulsation chambers of the two pairs of teat cups.

Outside valves 3 and 4 are chambers 12 and 13, which are connected with the vacuum system of the plant through the nipple 14. Chambers 12 and 13 are provided with outer seats for the valves 3 and 4, which seats have a somewhat larger diameter than the inner seats.

The two pulsator chambers 8 and 9 are in sealed relation to each other. As shown in Fig. 2 the sealing means may consist of a spheric portion against which flexible washers 19I abut. Each chamber encloses an expansible and contractable container, 15 and 16, which may be of elastic material, for instance rubber, having the shape of bellows. These containers are completely sealed from the surrounding air and communicate one with the other by means of pipes 17 and tubes 171, between which tubes a throttling device 18 may be inserted. The throttling device should be easily removable for inspection and adjustment.

The two containers act on the lever 19, which is connected with the arm 20, which in turn engages with a collar 21 sleeved on the valve spindle 5; collar 21, by means of the springs 22 and 23, acting on the valves 3 and 4 on the spindle 5.

The pulsator operates in the following manner.

Assuming that the parts occupy the position illustrated in Figs. 2 and 3: From chamber 1 the outer atmosphere communicates with channel 7 and thus with pulsator chamber 9 and nipple 11. Through nipple 14 a vacuum communicates, through chamber 12 and channel 6, with pulsator chamber 8 and nipple 10.

As the pressure in pulsator chamber 9 is higher than that in chamber 8, and as the air in containers 15 and 16, owing to their compressibility, tends to assume approximately the same pressure as the one prevailing in the surrounding containers, the air will stream from container 16 into container 15 through pipes 17; container 16 thereby being compressed and container 15 being expanded. The velocity of the air current may be adjusted to any desired value by the throttling device 18.

As the volume of container 15 increases it acts on lever 19, which strives to bring arm 20 over into the opposite position, spring 22 thereby being more and more compressed. As, however, the seat against which valve 4 rests is larger than the seat against which valve 3 rests, a certain force is required to change the position of the valves, and consequently no movement of the valves immediately occurs. But after container 15 attains a certain volume, the tension of spring 22 is sufficiently strong to overcome the pressure difference on the valves, which are then lifted from their seats and quickly thrown over to the opposite seats.

The connections to atmosphere and vacuum are now reversed. Pulsator chamber 9 and nipple 11, through channel 7 and chamber 13, communicate with vacuum, while pulsator chamber 8 and nipple 10, through channel 6 and chamber 1, communicate with the atmosphere. Container 15, which was expanded during the previous stroke, will now be compressed, and spring 23 will return the valves to the position shown in Fig. 3.

The two containers 15 and 16 and the throttled pipe 17 form a system which has no movable parts requiring seating and which is completely closed against the surrounding air.

If the system has been well cleaned and is of a suitable construction, there is full assurance that the through-flow area at the throttle 18 will not undergo any change. If the temperature rises, the air flows more easily but its volume is increased, as the containers 15 and 16 are elastic; and these two conditions thus counteract each other. With falling temperature a similar balanced condition exists.

The mechanical resistances to motion are obviously small. Only at one place other than the valve seats, namely, where lever 19 extends through the wall between pulsator chambers 8 and 9, is the sealing of a movable part required. The motion of lever 19 consists of only a slight turning and there is therefore but little friction. It is possible to avoid practically all friction at this point by using a flexible diaphragm. The friction of the symmetrically loaded valves is insignificant.

The factors which tend to change the rate of pulsation are thus eliminated, and the operation of the apparatus is very uniform. The possibility of disturbances in the operation is also practically excluded.

Since atmospheric pressure and vacuum alternate in nipples 10 and 11, the pulsator is specifically adapted for milking two pairs of teats alternately; that is, applying a vacuum at one pair of teats while there is full atmospheric pressure at the other. By self-evident modifications of the construction, the apparatus may of course also be used for synchronous milking of all the teats.

The described construction is susceptible of many modifications. It is, for instance, not necessary that containers 15 and 16 and pipes 17 should be filled with air. Other gases, and even liquids, may be used. Owing to its slower rate of flow and small compressibility, a liquid offers certain advantages, but the fact that the viscosity of the liquid often considerably varies with the temperature limits the number of liquids that are available for satisfactory operation.

Instead of arranging two working fluid containers as shown in Fig. 6 and operating as hereinbefore described, I may employ a single container 16a, which, through a tube 170, alternately exhausts into and inhales from an auxiliary container 15a (see Fig. 10), which is always surrounded by constant pressure, preferably full atmospheric pressure and which will operate satisfactorily to directly control valve 29. The function of such a container is to ensure that one and the same quantity of fluid always circulates, so that no impurities can enter from the outside. The working container 16a is in this construction influenced by a spring 161, which compresses the container with a force that corresponds to about half the difference of pressure between full pressure and vacuum. When there is full atmospheric pressure in the surrounding pulsator chamber, the container 16a is compressed by the spring; when the surrounding chamber is under vacuum the container 16a is expanded by the fluid streaming in from the auxiliary container 15a. It is also possible, instead of compressing the working container by a spring, to expand the auxiliary container by another spring; the result in both constructions being the same.

The changes of volume of one of the containers, preferably the container 16a, then act on the regulating devices which control the distribution of the pressure.

An apparatus of this kind may be preferred, particularly in case it is desired to provide vacuum and pressure periods of different duration, as such periods can be easily created by making the force of the spring action on the container somewhat greater or less than half the difference of pressure. In this case the auxiliary container need not, of course, be enclosed in a pulsator chamber, but may be located anywhere.

Figure 4:
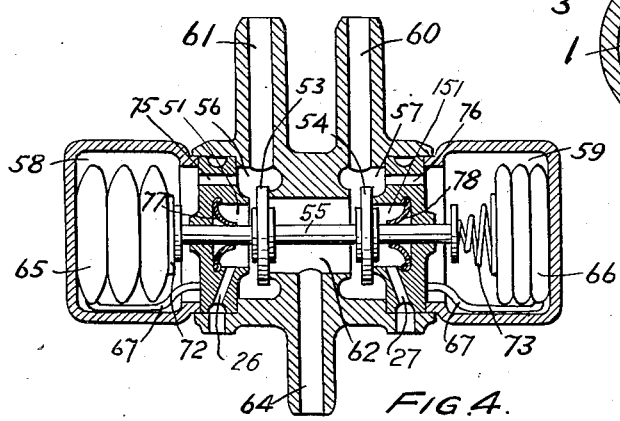
Fig. 4 is a sectional view of a modification.

Fig. 4 is a sectional view of a modification which may have certain advantages owing to its simplicity.

Chamber 62 communicates with the vacuum system through the nipple 64. Chambers 51 and 151 communicate with the outer atmosphere. Chambers 56 and 57 communicate with the nozzles 61 and 60, from which the tubes to the teat cups extend, and are also, through the passages 75 and 76, connected with pulsator chambers 58 and 59 in which containers 65 and 66 are located. These containers communicate with each other by a pipe 67, which is suitably throttled.

The valve spindle 55, which is provided with valves 53 and 54, is shifted by the operation of the containers acting through springs 72 and 73.

From the description of the first described pulsator, the operation of the pulsator of Fig. 4 will be understood.

It is advisable, if not necessary, in this type of pulsator, to provide rubber or leather sealing means 77 and 78 against axial leakage, but as the movement is quite short this is not a serious drawback. The sealing means may be of bellows or flexible diaphragm type. It should also be noted that even if a small leakage should occur at these places, and if thereby any foreign matter should enter the pulsator, it would be retained in the pulsator chambers 58 and 59, where it would be relatively harmless.

Owing to its compact and symmetric construction, this type of pulsator is particularly suitable for use where it is desired to arrange the pulsator at the teat cups.

It should perhaps be pointed out that the springs 72 and 73 referred to in connection with the above embodiments are not absolutely necessary, as at least in certain cases the elasticity of the containers themselves and of the air enclosed therein is sufficient to effect the quick reversing of the valve system, as soon as it is pushed from its one end position.

It should also be mentioned that if it is desired to establish high and low pressure periods of different duration, this may be effected in a great many ways, for instance, by using springs 72 and 73 of different elasticity.

The devices controlling the distribution of the pressure need not be valves of the type shown, but elements of the cock or slide valve type may be substituted. These latter do not require so high a degree of accuracy in manufacture and have no intermediary position, as there is direct communication between the pressure and vacuum sides, but on the other hand they usually work with greater friction. It should be stated that, unlike the valves in the previously described pulsators, they are not retained in their operation positions by a fixed force which rapidly diminishes in strength if but a very small movement takes place. In order to produce a distinct and uniform pulsation, such regulating devices should, therefore, be provided with a special mechanism which enables a quick reversing of the device.

A pulsator of this modified type is shown in Figs. 5, 6, 7 and 8.

Nipple 28 is connected with the vacuum system, so that vacuum penetrates to the inner end of the oscillatable valve 29, which has a square socket fitting the squared end of the shaft 50. At the outer end of the valve there is full atmospheric pressure, which may be admitted, in the usual way, through a strainer. The valve is provided with channels 31 and 32 in communication with the vacuum system through nipple 28 and respectively with channels 33 and 34 communicating with the atmosphere through the hole 25 in the bottom of the valve housing. In the valve housing there are two channels 35 and 37 communicating respectively with the nipples 110 and 100 and two channels 36 and 38 communicating respectively with the pulsator chambers 90 and 80. It should be noted that this arrangement, providing four channels in the valve and four channels in the valve housing, is used in order to get the valve radially balanced; otherwise two channels would suffice, connections 100 and 110 communicating direct with chambers 90 and 80 or with the channels 36 and 38 respectively leading to the said chambers.

In pulsator chambers 80 and 90 fluid containers 45 and 46 are provided and are connected with each other as hereinbefore described. The containers act on a lever 49, which is connected with a hollow shaft 39 carying a lever 40. The latter is in turn connected, by means of a spring 41, with an arm 42 on shaft 50.

Assuming that the apparatus starts working with the parts in the position illustrated in the figures, the operation is as follows:

The outer atmosphere communicates through channels 25, 33 and 35 with nozzle 110 and through channels 25, 34 and 36 with pulsator chamber 90. Vacuum communicates through the channels 31 and 37 with nozzle 100 and through channels 32 and 38 with pulsator chamber 80. Under the influence of the higher pressure container 46 begins to be compressed, and its contents stream over into container 45, which is under a lower pressure. The latter therefore swells out and acts on lever 49, which moves lever 40 over to the other side. When this movement has continued so far that "the dead centre" has been passed, arm 42 and with it valve 29 are turned over into the opposite position, so that full pressure and vacuum are reversed in the connections 100 and 110 as well as the pulsator chambers 80 and 90. A movement the reverse of that described then returns the parts to the positions shown in the drawings. Containers 45 and 46 (like containers 15 and 16) should be pneumatically connected. The connection may be identical with that shown in Fig. 2, the passage through the partition between chambers 80 and 90 being shown at 48, Fig. 5.

In the embodiments of my invention hereinbefore described it has been assumed that the two fluid containers, as regards variations of their volume, are so far mechanically independent of each other that the one can be compressed independent of the expansion of the other. It may be, however, desirable to make the two containers interdependent in such a way that the total of their volumes is kept approximately constant by mechanical means. In this way it is possible to counteract the harmful influence of lack of complete tightness which may possibly develop in the containers. Although this would not immediately cause any disturbances in the operation, it could yet, in the long run, entail difficulties because of reduction in the total amount of air enclosed in the two containers. An arrangement for this purpose is shown in Fig. 9. This arrangement may be the same as in Fig. 2 except that the lever 190, which corresponds to lever 19 of Fig. 2, is adapted, as container 15 and 16 expands, to correspondingly mechanically compress the other container 16 or 15.

A pulsator of the above type may be used, of course, independently of the type of teat cups that are employed; but it is particularly designed for so-called double chambered cups, the inner chamber of which is exposed to continuous partial vacuum and the other one to alternate atmospheric pressure and partial vacuum.

The throttling device 18 may be, as usual, so arranged that it can be adjusted from the outside without necessitating its removal.

What I claim and desire to protect by Letters Patent is:

1. A milking machine pulsator comprising means providing air passages adapted to communicate respectively with sources of high and low air pressure, an air chamber, two fluid containers one of which is located within said chamber and is expansible and contractable, a conduit allowing communication at a regulated rate back and forth between said fluid containers, means providing two air pulsation passages adapted for connection with teat cups, valve mechanism operable in one position to connect one pulsation passage with said high pressure air passage and the other pulsation passage with said low pressure air passage and in another position to reverse said connections, and means operable by the container during the expansion and contraction thereof, to operate said valve mechanism.

2. A milking machine pulsator comprising means providing air passages adapted for communication with sources of high and low air pressure respectively, an air chamber connectable with either passage, two fluid containers which are expansible and contractable, one of which is positioned within said chamber, a conduit allowing flow of fluid at a regulated rate back and forth between said fluid containers, said containers and conduit forming a closed system, valve mechanism operable to connect said chamber alternately with high and low pressure, and means, operable by the containers during the expansion and contraction thereof due to changes of pressure in said air chamber, to operate said valve mechanism and thereby change the air pressure connections to said chamber.

3. A milking machine pulsator comprising means providing passages adapted to communicate respectively with sources of high and low air pressure, two air chambers, two expansible and contractable fluid containers positioned in the respective air chambers, a conduit allowing flow of fluid at a regulated rate back and forth between said containers, said containers and conduit forming a closed system, valve mechanism operable to connect the two chambers with the high pressure and low pressure passages respectively and to reverse such connections, and means, operable by the containers during the expansion and contraction thereof due to changes of pressure in their respective chambers, to operate said valve mechanism and thereby reverse the air pressure connections to said chambers.

4. A milking machine pulsator comprising means providing air passages adapted to communicate respectively with sources of high and low air pressure, an air chamber, two fluid containers one of which is located within said chamber and is expansible and contractable, a conduit allowing communication at a regulated rate back and forth between said fluid containers, means providing two air pulsation passages adapted for connection with teat cups, means operable in one position to connect one pulsation passage with said high pressure air passage and the other pulsation passage with said low pressure air passage and in another position to reverse said connections, and means, operable by the container during the expansion and contraction thereof, to operate said passage connecting means; said two last specified means including a valve and also spring mechanism, operable when said expansible and contractable container, during the flow of fluid therefrom or thereinto, has assumed a certain volume, to effect a quick shift of the valve.

5. A milking machine pulsator comprising means providing air passages adapted for communication with sources of high and low air pressure respectively, an air chamber connectable with either passage, two fluid containers which are expansible and contractable, one of which is positioned within said chamber, a conduit allowing flow of fluid at a regulated rate back and forth between said fluid containers, said containers and conduit forming a closed system, spring mechanism and valve mechanism, operable by the containers during the expansion and contraction thereof and by the action of said spring mechanism, to shift the connection of said chamber from one air passage to the other.

6. A milking machine pulsator comprising means providing passages adapted to communicate respectively with sources of high and low air pressure, two air chambers, two expansible and contractable fluid containers positioned in the respective air chambers, a conduit allowing flow of fluid at a regulated rate back and forth between said containers, said containers and conduit forming a closed system, valve mechanism operable to connect the two chambers with the high pressure and low pressure passages respectively and to reverse such connections, spring mechanism, and means, operable by said fluid containers and spring mechanism, adapted to operate said valve mechanism and thereby reverse the air pressure connections to said chambers.

7. A milking machine pulsator comprising means providing air passages adapted for communication with sources of high and low air pressure respectively, an air chamber connectable with either passage, two fluid containers which are expansible and contractable, one of which is positioned within said chamber, a conduit allowing flow of fluid at a regulated rate back and forth between said fluid containers, said containers and conduit forming a closed system, valve mechanism adapted to connect said chamber alternately with high and low pressure, and means, operable when said expansible and contractable container, in the flow of fluid thereinto and therefrom, has assumed a predetermined volume, to shift said valve mechanism to quickly reverse the air pressure connections to said chamber.

8. A milking machine pulsator comprising means providing passages adapted to communicate respectively with sources of high and low air pressure, two air chambers, two expansible and contractable fluid containers positioned in the respective air chambers, a conduit allowing flow of fluid at a regulated rate back and forth between said containers, said containers and conduit forming a closed system, valve mechanism operable to connect the two chambers with the high pressure and low pressure passages respectively and to reverse such connections, and means, operable when said containers, during the flow of fluid between them, have assumed predetermined volumes, to shift said valve mechanism to quickly reverse the air pressure connections to said chambers.

9. A milking machine pulsator in accordance with claim 4 wherein the valve presents pressure areas exposed to said high and low pressures respectively and tending to resist said shift of the valve.

10. A milking machine pulsator in accordance with claim 5 wherein the valve mechanism presents pressure areas exposed respectively to said high and low pressures and tending to resist the shift of the valve mechanism required to change the pressure connections to said chamber.

11. A milking machine pulsator in accordance with claim 6, wherein the valve mechanism presents pressure areas exposed to said high and low pressures and tending to resist the shift of the valve mechanism required to reverse the air pressure conditions to said chambers.

12. A milking machine pulsator in accordance with claim 2, including a mechanical connection between said containers adapted to insure the maintenance of the sum of their volumes approximately constant.

13. A milking machine pulsator in accordance with claim 3, including a mechanical connection between said containers adapted to insure the maintenance of the sum of their volumes approximately constant.

ERIK AUGUST FORSBERG.